(12) United States Patent
Li

(10) Patent No.: US 12,307,131 B2
(45) Date of Patent: May 20, 2025

(54) METHOD AND APPARATUS FOR PERFORMING DATA ACCESS CONTROL OF MEMORY DEVICE WITH AID OF READING PARAMETER OPTIMIZATION

(71) Applicant: Silicon Motion, Inc., Hsinchu County (TW)

(72) Inventor: Fahao Li, Shenzhen (CN)

(73) Assignee: Silicon Motion, Inc., Hsinchu County (TW)

( * ) Notice: Subject to any disclaimer, the term of this patent is extended or adjusted under 35 U.S.C. 154(b) by 77 days.

(21) Appl. No.: 18/370,396

(22) Filed: Sep. 19, 2023

(65) Prior Publication Data

US 2025/0085893 A1     Mar. 13, 2025

(30) Foreign Application Priority Data

Sep. 8, 2023   (CN) .......................... 202311157134.X

(51) Int. Cl.
G06F 3/06          (2006.01)
(52) U.S. Cl.
CPC .......... G06F 3/0659 (2013.01); G06F 3/0619 (2013.01); G06F 3/0679 (2013.01)
(58) Field of Classification Search
CPC .................................................... G06F 3/0619
See application file for complete search history.

(56) References Cited

U.S. PATENT DOCUMENTS

| | | | |
|---|---|---|---|
| 9,633,740 B1* | 4/2017 | Alhussien | H03M 13/1125 |
| 2017/0125111 A1* | 5/2017 | Sankaranarayanan | |
| | | | G06F 11/0793 |
| 2017/0271031 A1 | 9/2017 | Sharon et al. | |
| 2020/0192791 A1 | 6/2020 | Yang et al. | |
| 2021/0183454 A1* | 6/2021 | Jeon | G11C 29/028 |

FOREIGN PATENT DOCUMENTS

| | | |
|---|---|---|
| TW | 201511013 A | 3/2015 |
| TW | 202322135 A | 6/2023 |
| TW | 202329141 A | 7/2023 |

* cited by examiner

Primary Examiner — Hosain T Alam
Assistant Examiner — Nicholas A. Paperno
(74) Attorney, Agent, or Firm — Winston Hsu

(57) ABSTRACT

A method for performing data access control of a memory device and associated apparatus are provided. The memory device may be arranged to receive a plurality of host commands for performing data access according to the plurality of host commands, and perform a reading parameter optimization procedure to determine at least one optimized reading parameter, for maintaining correctness of data reading, for example, initialize a raw data indication reference, a temporary minimum reading parameter and a temporary maximum reading parameter, calculate the reading parameter to be equal to an average of the temporary minimum reading parameter and the temporary maximum reading parameter, read according to the reading parameter, for determining a raw data indication, and compare the raw data indication with the raw data indication reference, for selectively adjusting temporary reading parameters or determining an optimized reading parameter.

11 Claims, 9 Drawing Sheets

METHOD AND APPARATUS FOR PERFORMING DATA ACCESS CONTROL OF MEMORY DEVICE WITH AID OF READING PARAMETER OPTIMIZATION

BACKGROUND OF THE INVENTION

1. Field of the Invention

The present invention is related to memory control, and more particularly, to a method and apparatus for performing data access control of a memory device.

2. Description of the Prior Art

A memory device may comprise a Flash memory for storing data, and the management of accessing the Flash memory is complicated. For example, the memory device may be a memory card, a solid state drive (SSD), or an embedded storage device such as that conforming to Universal Flash Storage (UFS) specification. When a manufacturer tries to implement some features of the memory device according to existing specification, some problems may occur. More particularly, the memory device may spend too much time on performing some internal operations of the memory device in response to host-side requests, causing the overall performance to be reduced. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data access control of a memory device, in order to solve the above-mentioned problems.

At least one embodiment of the present invention provides a method for performing data access control of a memory device, where the method can be applied to a memory controller of the memory device. The memory device may comprise the memory controller and a non-volatile (NV) memory, and the NV memory may comprise at least one NV memory element (e.g., one or more NV memory elements). The method may comprise: receiving a plurality of host commands from a host device, for performing data access on the NV memory according to the plurality of host commands, wherein the data access comprises data reading; and performing a reading parameter optimization procedure to determine at least one optimized reading parameter, for maintaining correctness of the data reading. For example, the reading parameter optimization procedure may comprise: initializing a raw data indication reference, a temporary minimum reading parameter and a temporary maximum reading parameter, wherein the raw data indication reference is determined according to a default setting, and the temporary minimum reading parameter and the temporary maximum reading parameter are determined to be a maximum and a minimum of an adjustable reading parameter range of a reading parameter, respectively; in any iteration among at least one iteration of the reading parameter optimization procedure, calculating the reading parameter to be equal to an average of the temporary minimum reading parameter and the temporary maximum reading parameter; in said any iteration, controlling the NV memory to read according to the reading parameter, in order to obtain respective raw data of multiple memory cells in a memory cell group, for determining a raw data indication, wherein the raw data indication represents a number of memory cells whose raw data are equal to a predetermined logic value in a situation where the memory controller is reading the multiple memory cells of the memory cell group according to the reading parameter; and in said any iteration, comparing the raw data indication with the raw data indication reference to determine whether the raw data indication is greater than or less than the raw data indication reference, for selectively adjusting the temporary maximum reading parameter or the temporary minimum reading parameter to be equal to the reading parameter; wherein in a last iteration among at least one iteration, in response to the raw data indication being equal to the raw data indication reference, the memory controller is arranged to determine a first optimized reading parameter among the at least one optimized reading parameter to be equal to the reading parameter.

In addition to the above method, the present invention also provides a memory controller of a memory device, where the memory device comprises the memory controller and a NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller. The memory controller further comprises a transmission interface circuit, and the transmission interface circuit is arranged to perform communications with the host device. Additionally, the memory controller receives the plurality of host commands from the host device through the transmission interface circuit of the memory controller, for performing data access on the NV memory according to the plurality of host commands, wherein the data access comprises data reading; and the memory controller performs a reading parameter optimization procedure to determine at least one optimized reading parameter, for maintaining correctness of the data reading. For example, the reading parameter optimization procedure may comprise: initializing a raw data indication reference, a temporary minimum reading parameter and a temporary maximum reading parameter, wherein the raw data indication reference is determined according to a default setting, and the temporary minimum reading parameter and the temporary maximum reading parameter are determined to be a maximum and a minimum of an adjustable reading parameter range of a reading parameter, respectively; in any iteration among at least one iteration of the reading parameter optimization procedure, calculating the reading parameter to be equal to an average of the temporary minimum reading parameter and the temporary maximum reading parameter; in said any iteration, controlling the NV memory to read according to the reading parameter, in order to obtain respective raw data of multiple memory cells in a memory cell group, for determining a raw data indication, wherein the raw data indication represents a number of memory cells whose raw data are equal to a predetermined logic value in a situation where the memory controller is reading the multiple memory cells of the memory cell group according to the reading parameter; and in said any iteration, comparing the raw data indication with the raw data indication reference to determine whether the raw data indication is greater than or less than the raw data indication reference, for selectively adjusting the temporary maximum reading parameter or the temporary minimum reading parameter to be equal to the reading parameter; wherein in a last iteration among at least one iteration, in response to the raw data indication being equal to the raw data indication reference, the memory controller is arranged to determine a first optimized reading parameter among the at least one optimized reading parameter to be equal to the reading parameter.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

The present invention method and apparatus can guarantee that the memory device can operate properly in various situations, and more particularly, prevent spending too much time on performing some internal operations of the memory device in response to host-side requests. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
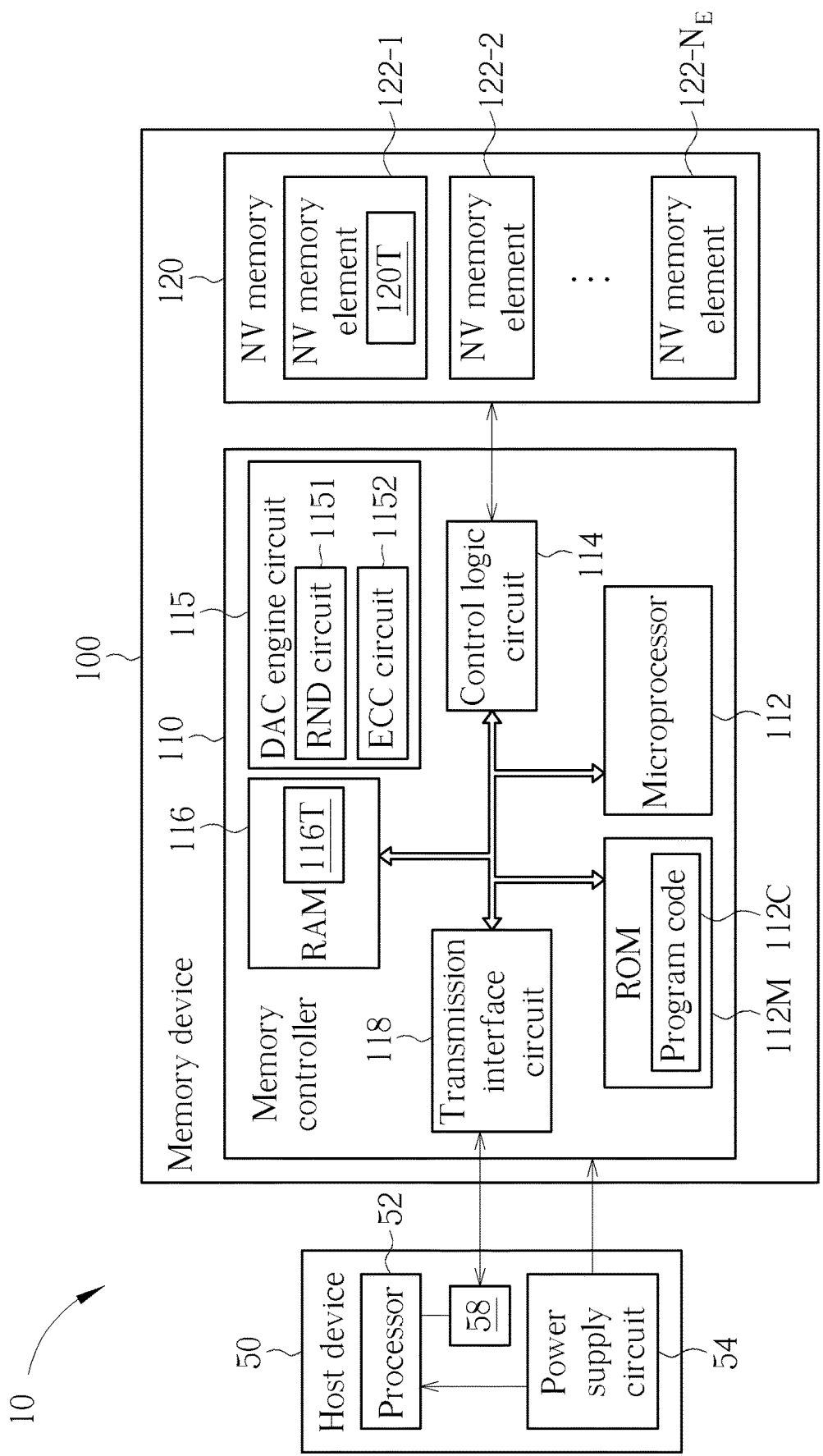
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). According to this embodiment, the memory device 100 may comprise a controller such as a memory controller 110, and may further comprise a non-volatile (NV) memory 120, where the memory controller 110 is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-$N_E$, where "$N_E$" may represent a positive integer that is greater than one. For example, the NV memory 120 may be a flash memory, and the plurality of NV memory elements 122-1, 122-2, . . . , and 122-$N_E$ may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a data access control (DAC) engine circuit 115, a random access memory (RAM) 116 (which may be implemented by way of static random access memory (SRAM), for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory.

Additionally, the control logic circuit 114 may be arranged to control the NV memory 120. The DAC engine circuit 115 may be arranged to perform data access control for the memory controller 110, and more particularly, may comprise a randomization circuit 1151 (labeled "RND circuit" for brevity) and an error correction code (ECC) circuit 1152, where the randomization circuit 1151 may perform randomization on the write data (e.g., the data to be written into the NV memory 120, during performing writing/programming upon the NV memory 120 in response to a write command from the host device 50) and perform de-randomization on the read data (e.g., the data read from the NV memory 120, during performing reading upon the NV memory 120 in response to a read command from the host device 50), and the ECC circuit 1152 may perform ECC encoding on the write data and perform ECC decoding on the read data, in order to protect data and/or perform error correction, but the present invention is not limited thereto. According to some embodiments, at least one portion (e.g., a portion or all) of the DAC engine circuit 115, such as the randomization circuit 1151 and the ECC circuit 1152, may be integrated into the control logic circuit 114. Regarding the write data, the ECC circuit 1152 may perform ECC encoding on the data to be written into the NV memory 120, to generate encoded data, and the randomization circuit 1151 may perform randomization on the encoded data to generate randomized data, for being programmed into the NV memory 120. Regarding the read data, the randomization circuit 1151 may perform de-randomization on a read out version of the randomized data stored in the NV memory 120, to generate a read out version of the encoded data, and the ECC circuit 1152 may perform ECC decoding on the read out version of the encoded data to correct any error thereof, for returning an error-free version of the encoded data to the host device 50.

The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, Non-Volatile Memory Express (NVMe) specification, embedded Multi Media Card (eMMC) specification, and Universal Flash Storage (UFS) specification), and may perform communications with the host device 50 (or the transmission interface circuit 58 therein) according to the one or more communications specifications for the memory device 100. Similarly, the transmission interface circuit 58 may conform to the one or more communications specifications, and may perform communications with the memory device 100 (or the transmission interface circuit 118 therein) according to the one or more communications specifications for the host device 50.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programming upon the memory units or data pages of corresponding physical addresses within the NV memory 120, where the physical addresses can be associated with the logical addresses. For example, the memory controller 110 may generate or update at least one logical-to-physical (L2P) address mapping table to manage the relationship between the physical addresses and the logical addresses, where the NV memory 120 may store a global L2P address mapping table 120T, for the memory controller 110 to control the memory device 100 to access data in the NV memory 120, but the present invention is not limited thereto.

For better comprehension, the global L2P address mapping table 120T may be located in a predetermined region within the NV memory element 122-1, such as a system region, but the present invention is not limited thereto. For example, the global L2P address mapping table 120T may be divided into a plurality of local L2P address mapping tables, and the local L2P address mapping tables may be stored in one or more of the NV memory elements 122-1, 122-2, . . . , and 122-$N_E$, and more particularly, may be stored in the NV memory elements 122-1, 122-2, . . . , and 122-$N_E$, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, . . . , 122-$N_E$}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval $[1, N_E]$) among the NV memory elements 122-1, 122-2, . . . , and 122-$N_E$ may comprise multiple blocks, and a block within the multiple blocks may comprise and record a specific number of pages, where the memory controller 110 may access a certain page of a certain block within the multiple blocks according to a block address and a page address.

According to some embodiments, as a reading voltage drift phenomenon regarding the NV memory 120 (or the NV memory elements 122-1, 122-2, . . . , and 122-$N_E$ therein) may occur, the memory controller 110 may try to obtain an optimal reading voltage Vth_Opt for performing reading upon the NV memory 120, in order to read the data correctly, where the reading voltage may be referred to as the threshold voltage according to some viewpoints, and therefore may be expressed with the symbol "Vth" for better comprehension, but the present invention is not limited thereto.

Figure 2:
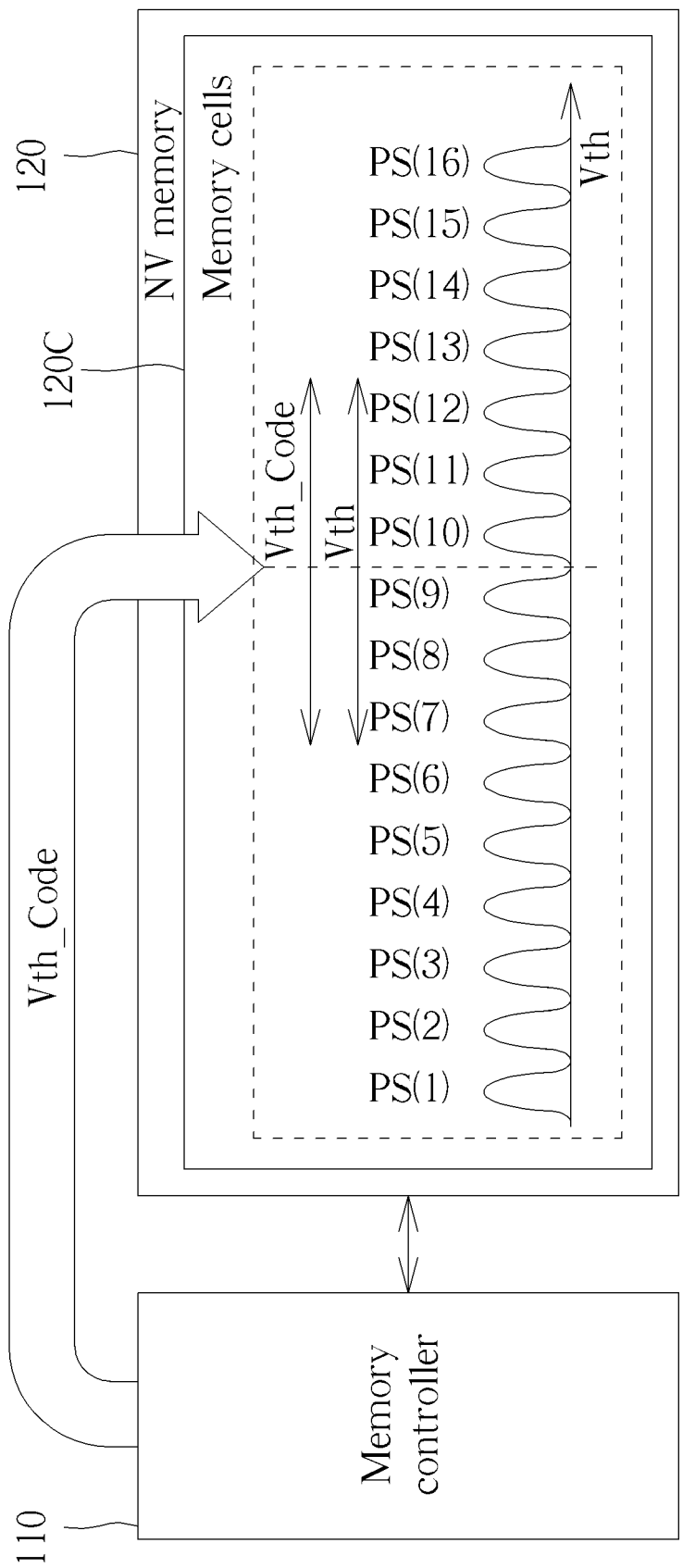
FIG. 2 is a diagram illustrating a reading voltage code control scheme according to an embodiment of the present invention.

FIG. 2 is a diagram illustrating a reading voltage code control scheme according to an embodiment of the present invention. The memory cells 120C of a memory cell group in the NV memory 120 shown in FIG. 2 may comprise a set of memory cells among multiple memory cells of the aforementioned any NV memory element 122-$n$, and any memory cell of the memory cells 120C may be in a programming state PS(y) selected from multiple candidate programming states {PS(1), . . . , PS(Y)}, where "Y" may represent a positive integer, and "y" may be an integer in the interval $[1, Y]$. For example, the memory cells 120C may be configured as quad-level cells (QLCs), and the candidate programming state count Y may be equal to 16, and therefore the multiple candidate programming states {PS(1), . . . , PS(Y)} may be illustrated to be the candidate programming states {PS(1), . . . , PS(16)} as shown in FIG. 2, but the present invention is not limited thereto. The memory cells 120C may be configured as any type of memory cells among multiple types of memory cells. For example, the memory cells 120C may be configured as single-level cells (SLCs), for storing 1 bit per cell in the NV memory element 122-$n$, where $Y=2^1=2$; the memory cells 120C may be configured as multi-level cells (MLCs) such as double-level cells (DLCs), for storing 2 bits per cell in the NV memory element 122-$n$, where $Y=2^2=4$; the memory cells 120C may be configured as triple-level cells (TLCs), for storing 3 bits per cell in the NV memory element 122-$n$, where $Y=2^3=8$; the memory cells 120C may be configured as the QLCs, for storing 4 bits per cell in the NV memory element 122-$n$, where $Y=2^4=16$; the memory cells 120C may be configured as penta-level cells (PLCs), for storing 5 bits per cell in the NV memory element 122-$n$, where $Y=2^5=32$; and the rest may be deduced by analogy.

As shown in FIG. 2, when there is a need, the memory controller 110 may send a reading voltage code Vth_Code to the NV memory 120, to configure the reading voltage Vth corresponding to the reading voltage code Vth_Code. For example, the reading voltage Vth may be positively correlated with the reading voltage code Vth_Code and/or there may be a linear relationship between the reading voltage Vth and the reading voltage code Vth_Code, and the reading voltage code Vth_Code may be regarded as a representative of the reading voltage Vth, but the present invention is not limited thereto. In addition, the memory controller 110 may dynamically adjust the reading voltage code Vth_Code to dynamically adjust the reading voltage Vth, in order to accurately determine the respective programming states {PS(y)} of the memory cells 120C, and therefore correctly determine the bit information corresponding to the programming state PS(y). For example, any candidate programming state PS among the candidate programming states {PS(1), . . . , PS(16)} may be associated with a corresponding bit sequence among the bit sequences {0000, 0001, . . . , 1111} according to a gray code, and the aforementioned any candidate programming state PS may represent the corresponding bit sequence, but the present invention is not limited thereto. According to some embodiments, the relationships between the bit sequences {0000, 0001, . . . , 1111} and the candidate programming states {PS(1), . . . , PS(16)} may vary.

Figure 3:
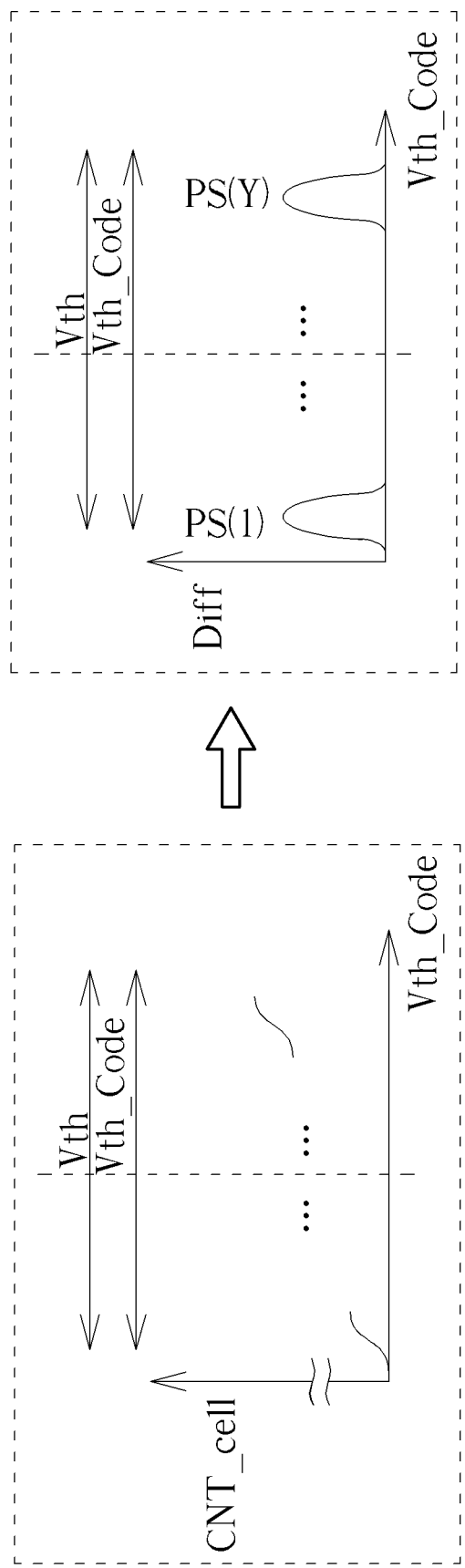
FIG. 3 is a diagram illustrating a programming-state monitoring control scheme according to an embodiment of the present invention.

FIG. 3 is a diagram illustrating a programming-state monitoring control scheme according to an embodiment of the present invention. The memory controller 110 may increase or decrease the reading voltage code Vth_Code to increase or decrease the reading voltage Vth correspondingly, and monitor the number of memory cells having the raw data of bit 0 (e.g., the raw data obtained by reading the memory cells according to the reading voltage Vth) to be the memory cell count CNT_cell, in order to obtain multiple monitored values indicating multiple relationships between the memory cell count CNT_cell and the reading voltage code Vth_Code (or the reading voltage Vth), and/or a curve of the memory cell count CNT_cell with respect to the reading voltage code Vth_Code (or the reading voltage Vth). In addition, the memory controller 110 may determine the variations of the memory cell count CNT_cell with respect to the reading voltage code Vth_Code (or the reading voltage Vth), and more particularly, calculate the difference between any two adjacent monitored values of the memory cell count CNT_cell along the Vth_Code axis (or the Vth axis) to be the variation of the memory cell count CNT_cell at a corresponding point on the Vth_Code axis (or the Vth axis), in order to obtain multiple difference values indicating multiple relationships between the cell count difference Diff and the reading voltage code Vth_Code (or the reading voltage Vth), and/or a curve of the cell count difference Diff with respect to the reading voltage code Vth_Code (or the reading voltage Vth). As a result, the curve of the cell count difference Diff with respect to the reading voltage code Vth_Code (or the reading voltage Vth) may have partial curves respectively corresponding to the multiple candidate programming states {PS(1), . . . , PS(Y)}.

According to some embodiments, when reading the memory cells 120C according to the reading voltage Vth, the memory controller 110 may obtain the raw data (e.g., a raw bit such as "1" or "0", read according to the reading voltage Vth) of a memory cell among the memory cells 120C from the NV memory 120. For example, the memory cells in the NV memory 120 may be implemented by way of floating-gate metal-oxide-semiconductor field-effect transistors (MOSFETs), and whether a current can flow through a channel (e.g., an n-channel) of a memory cell easily under a control gate voltage of the memory cell may depend on the number of charges (e.g., electrons) stored in the memory cell, where the raw data such as "0" may indicate that the reading voltage Vth as well as the control gate voltage are high enough to allow the current to flow through the channel, and the raw data such as "1" may indicate that the reading voltage Vth as well as the control gate voltage are insufficient for the current to flow through the channel, but the present invention is not limited thereto. According to some embodiments, the architecture of the memory cells in the NV memory 120 may vary.

Figure 4:
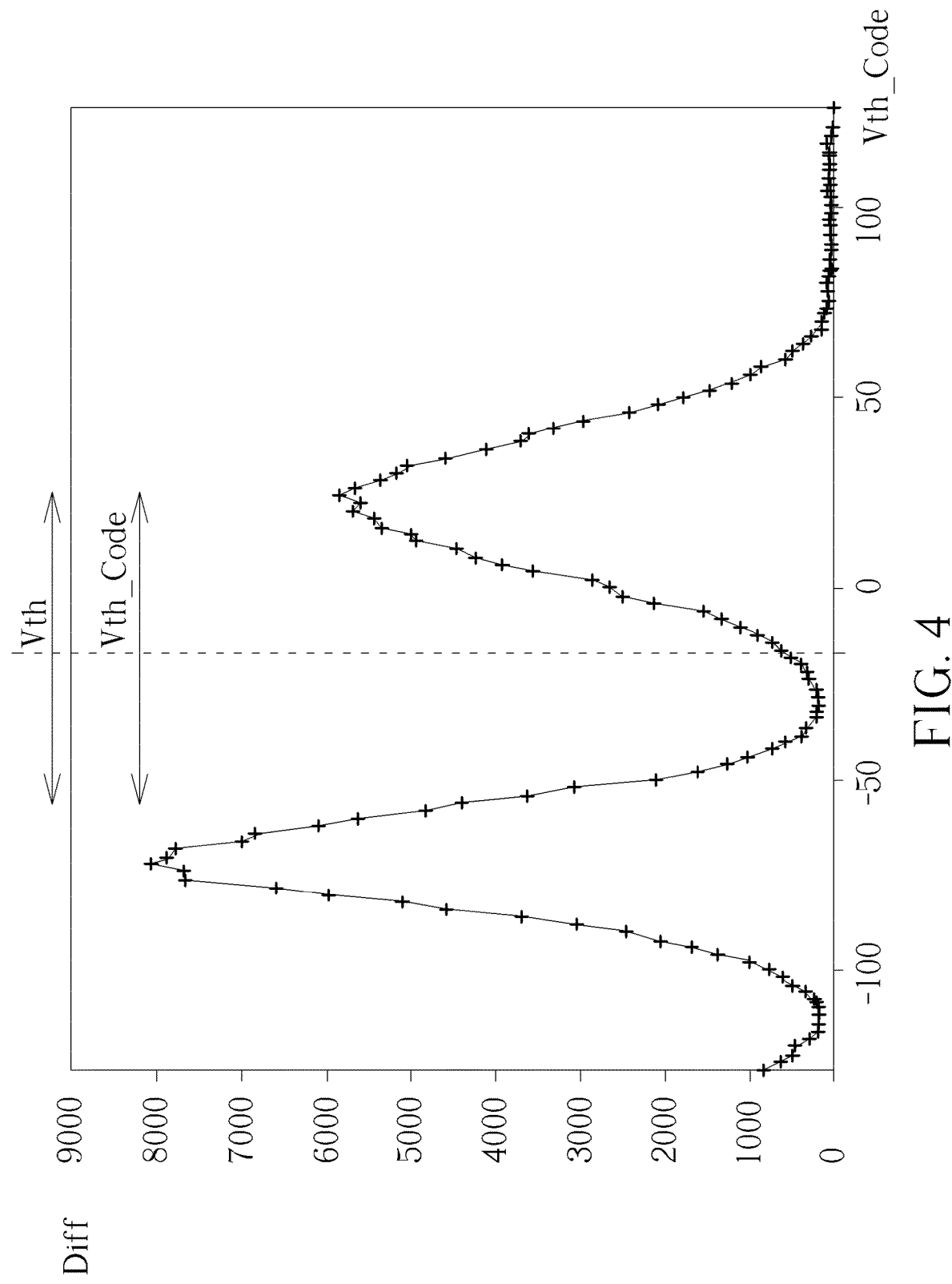
FIG. 4 is a diagram illustrating a reading voltage scanning control scheme according to an embodiment of the present invention.

FIG. 4 is a diagram illustrating a reading voltage scanning control scheme according to an embodiment of the present invention, where the horizontal axis may represent the reading voltage code Vth_Code corresponding to the reading voltage Vth, and the vertical axis may represent the cell count difference Diff corresponding to the memory cell count CNT_cell. For example, the memory cell group may comprise at least one portion of memory cells (e.g., a portion of memory cells, or all memory cells) among the multiple memory cells of the aforementioned any NV memory element 122-$n$, and the respective programming states {PS(y)} of the memory cells in the memory cell group may vary and may have a certain distribution with respect to the reading voltage code Vth_Code (or the reading voltage Vth). Regarding the memory cell group, the curve shown in FIG. 4 may indicate a portion of relationships among the multiple relationships between the cell count difference Diff and the reading voltage code Vth_Code (or the reading voltage Vth), but the present invention is not limited thereto. According to some embodiments, the range of the reading voltage code Vth_Code, the range of the cell count difference Diff, and/or the curve shown in FIG. 4 may vary. According to some embodiments, the memory cell group may comprise the memory cells of the NV memory elements 122-1, 122-2, . . . , and 122-$N_E$.

For example, assuming that $V\_a \geq V\_min$ and $V\_b \leq V\_max$, the memory controller 110 may select a predetermined reading voltage range [V_a, V_b] (e.g., the range between the reading voltages V_a and V_b) among an adjustable reading voltage range [V_min, V_max] (e.g., the range between the minimum reading voltage V_min and the maximum reading voltage V_max), and scan the predetermined reading voltage range [V_a, V_b] with a fixed step size Vstep, and more particularly, read the memory cells of the memory cell group according to the reading voltages {V_a, (V_a+Vstep), (V_a+(2*Vstep)), ..., V_b} to obtain the associated information, respectively. The memory controller 110 may determine at least one local minimum of the cell count difference Diff (e.g., a local minimum of the curve shown in FIG. 4) according to the relationships between the cell count difference Diff and the reading voltage code Vth_Code, for distinguishing any two adjacent candidate programming states {PS} among the multiple candidate programming states {PS(1), ..., PS(Y)} regarding the memory cell group. When using the reading voltage code Vth_Code as the representative of the reading voltage Vth, the memory controller 110 may select a predetermined reading voltage code range [V_a_Code, V_b_Code] (e.g., the range between the reading voltage codes V_a_Code and V_b_Code respectively corresponding to the reading voltages V_a and V_b) among an adjustable reading voltage code range [V_min_Code, V_max_Code] (e.g., the range between the minimum reading voltage code V_min_Code and the maximum reading voltage code V_max_Code respectively corresponding to the minimum reading voltage V_min and the maximum reading voltage V_max), and scan the predetermined reading voltage code range [V_a_Code, V_b_Code] with a fixed step size Vstep_Code (e.g., Vstep_Code=1) corresponding to the fixed step size Vstep. Taking the QLCs cell as an example of the memory cells 120C, the memory controller 110 may perform similar scanning operations to determine 15 values on the Vth_Code axis (or the Vth axis) that correspond to 15 local minimums of the cell count difference Diff, to be 15 optimal reading voltage codes {Vth_Code_Opt} (or 15 optimal reading voltages {Vth_Opt}) for distinguishing the candidate programming states {PS(1), ..., PS(16)}.

As the number of charges in the memory cells may change with respect to time due to some reasons, the programming states {PS(y)} in the memory cell group may change correspondingly. When a read error occurs, the memory controller 110 may perform a read retry procedure to try reading the NV memory 120 with one or more adjusted reading voltages, in order to correct the read error. For example, the memory controller 110 may perform reading voltage adjustment according to the reading voltage scanning control scheme, to accurately determine the respective programming states {PS(y)} of the memory cells in the memory cell group, and therefore correctly determine the respective bit information of the memory cells in the memory cell group, but the present invention is not limited thereto. According to some embodiments, the memory controller 110 may perform reading voltage adjustment according to the memory cell count CNT_cell directly, having no need to calculate the cell count difference Diff, in order to enhance the overall performance.

Figure 5:
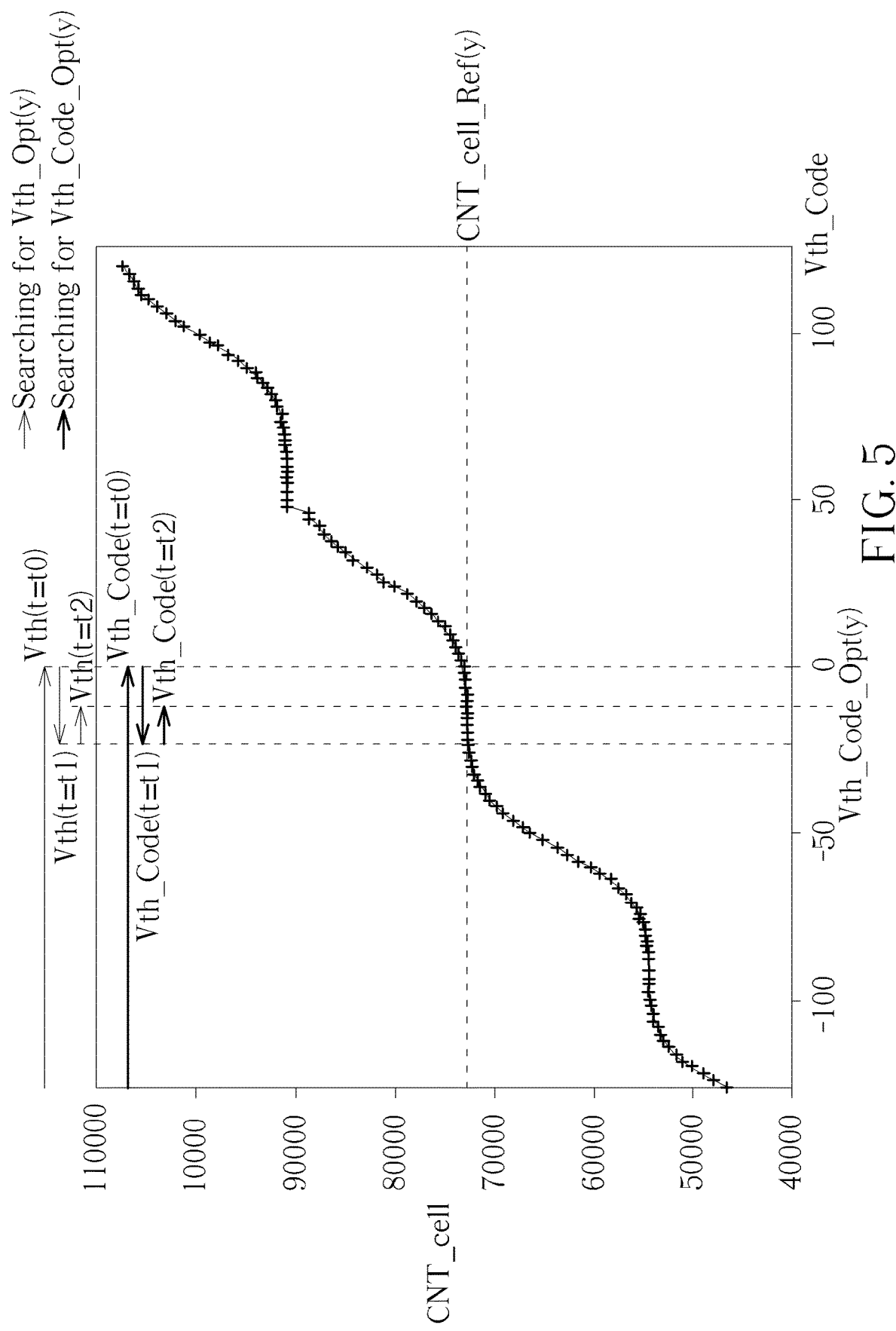
FIG. 5 is a diagram illustrating a reading voltage searching control scheme of a method for performing data access control of a memory device according to an embodiment of the present invention.

FIG. 5 is a diagram illustrating a reading voltage searching control scheme of a method for performing data access control of a memory device according to an embodiment of the present invention. The memory controller 110 may set or adjust the reading voltage code Vth_Code to set or adjust the reading voltage Vth, and monitor the memory cell count CNT_cell to search for an optimal reading voltage code Vth_Code_Opt(y) (e.g., an optimal value of the reading voltage code Vth_Code) corresponding to a reference memory cell count CNT_cell_Ref(y) (e.g., a reference value of the memory cell count CNT_cell), and to search for an optimal reading voltage Vth_Opt(y) (e.g., an optimal value of the reading voltage Vth) corresponding to the reference memory cell count CNT_cell_Ref(y), where the reference memory cell count CNT_cell_Ref(y) may be regarded as a target memory cell count (e.g., a target value of the memory cell count CNT_cell) of one or more searching operations, and may be determined according to a default setting in advance to be a predetermined target value corresponding to a local minimum of the cell count difference Diff. For example, at a time point t0, the memory controller 110 may set the reading voltage code Vth_Code as the reading voltage code Vth_Code (t=t0) to set the reading voltage Vth as the reading voltage Vth (t=t0), and monitor the memory cell count CNT_cell to determine that the memory cell count CNT_cell does not reach the reference memory cell count CNT_cell_Ref(y), and therefore determine to continue searching; at a time point t1, the memory controller 110 may set the reading voltage code Vth_Code as the reading voltage code Vth_Code (t=t1) to set the reading voltage Vth as the reading voltage Vth (t=t1), and monitor the memory cell count CNT_cell to determine that the memory cell count CNT_cell does not reach the reference memory cell count CNT_cell_Ref(y), and therefore determine to continue searching; and at a time point t2, the memory controller 110 may set the reading voltage code Vth_Code as the reading voltage code Vth_Code (t=t2) to set the reading voltage Vth as the reading voltage Vth (t=t2), and monitor the memory cell count CNT_cell to determine that the memory cell count CNT_cell reaches the reference memory cell count CNT_cell_Ref(y), and therefore determine that the one or more searching operations are completed; but the present invention is not limited thereto. According to some embodiments, the number of times of setting the reading voltage code Vth_Code (or the reading voltage Vth) in the one or more searching operations, the range of the reading voltage code Vth_Code, the range of the memory cell count CNT_cell, and/or the curve shown in FIG. 5 may vary.

As the curve of the cell count difference Diff with respect to the reading voltage code Vth_Code (or the reading voltage Vth) may have (Y-1) local minimums (without considering the end points of the whole curve), the memory controller 110 may search for (Y-1) optimal reading voltage codes {Vth_Code_Opt(y)} such as the optimal reading voltage codes {Vth_Code_Opt(1), ..., Vth_Code_Opt(Y-1)}, and search for (Y-1) optimal reading voltages {Vth_Opt(y)} such as the optimal reading voltages {Vth_Opt(1), ..., Vth_Opt(Y-1)}. Taking the QLCs cell as an example of the memory cells 120C, the memory controller 110 may perform similar searching operations to determine 15 values on the Vth_Code axis (or the Vth axis) to be 15 optimal reading voltage codes {Vth_Code_Opt(y)} (or 15 optimal reading voltages {Vth_Opt(y)}) for distinguishing the candidate programming states {PS(1), ..., PS(16)}, where the 15 optimal reading voltage codes {Vth_Code_Opt(y)} (or the 15 optimal reading voltages {Vth_Opt(y)}) may correspond to the 15 local minimums of the cell count difference Diff.

Figure 6:
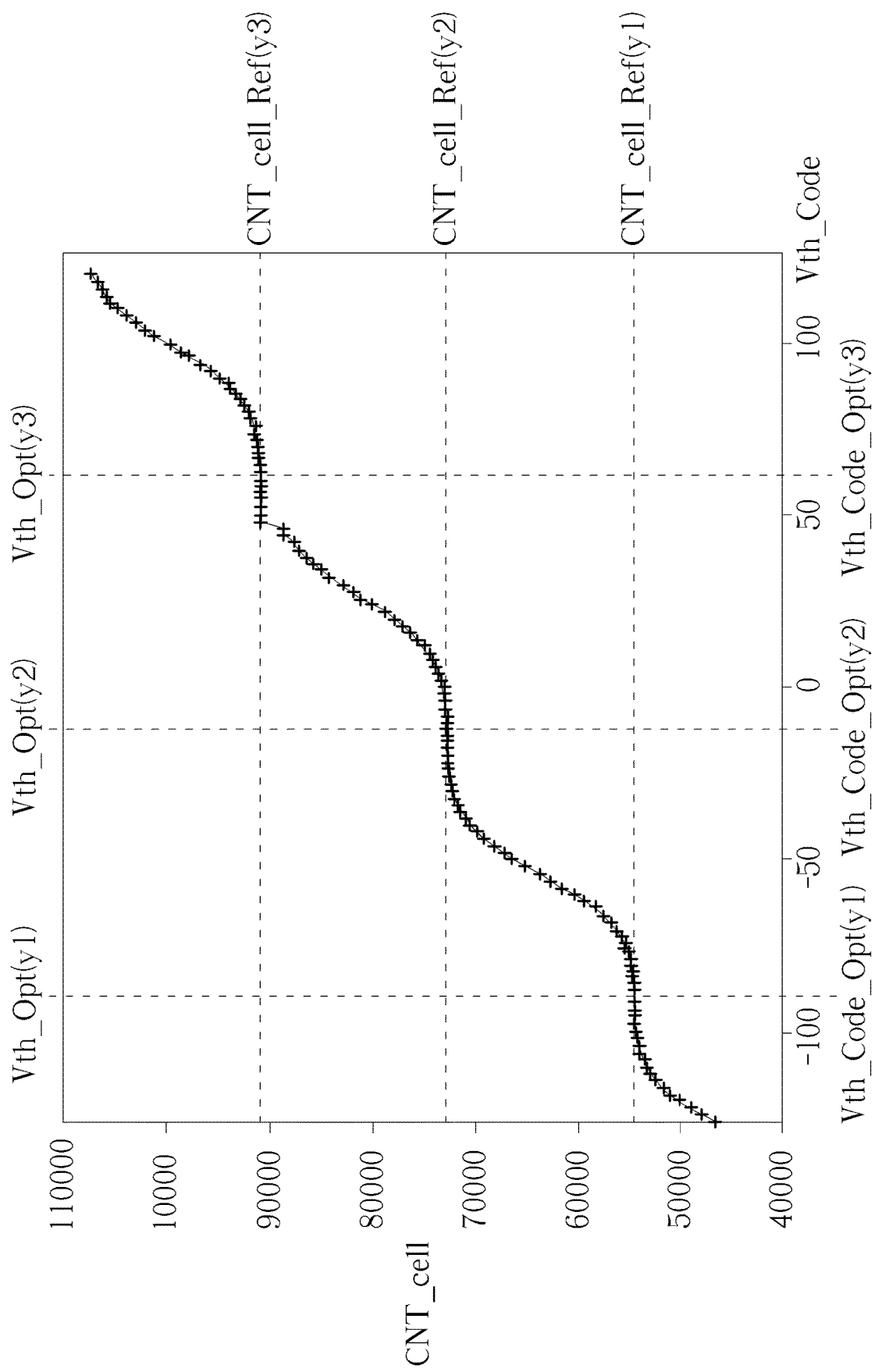
FIG. 6 is a diagram illustrating some implementation details of the reading voltage searching control scheme shown in FIG. 5 according to an embodiment of the present invention.

FIG. 6 is a diagram illustrating some implementation details of the reading voltage searching control scheme shown in FIG. 5 according to an embodiment of the present invention, where the symbols "y1", "y2" and "y3" may represent three consecutive integers in the interval [1, Y], and y1<y2<y3. For example, when y=y1, the memory controller 110 may search for the optimal reading voltage code Vth_Code_Opt(y1) and the optimal reading voltage Vth_Opt(y1), for distinguishing the candidate programming states PS(y1) and PS(y1+1); when y=y2, the memory controller 110 may search for the optimal reading voltage code Vth_Code_Opt(y2) and the optimal reading voltage Vth_Opt(y2), for distinguishing the candidate programming states PS(y2) and PS(y2+1); and when y=y3, the memory controller 110 may search for the optimal reading voltage code Vth_Code_Opt(y3) and the optimal reading voltage Vth_Opt(y3), for distinguishing the candidate programming states PS(y3) and PS(y3+1); and the rest may be deduced by analogy. For brevity, similar descriptions for this embodiment are not repeated in detail here.

According to some embodiments, the reading voltage code Vth_Code may be any integer in the interval [V_min_Code, V_max_Code], where V_min_Code=−128 and V_max_Code=+128, for example, as illustrated with the range of the reading voltage code Vth_Code shown in any of FIGS. 4-6, but the present invention is not limited thereto. According to some embodiments, the minimum reading voltage code V_min_Code and the maximum reading voltage code V_max_Code may vary.

Figure 7:
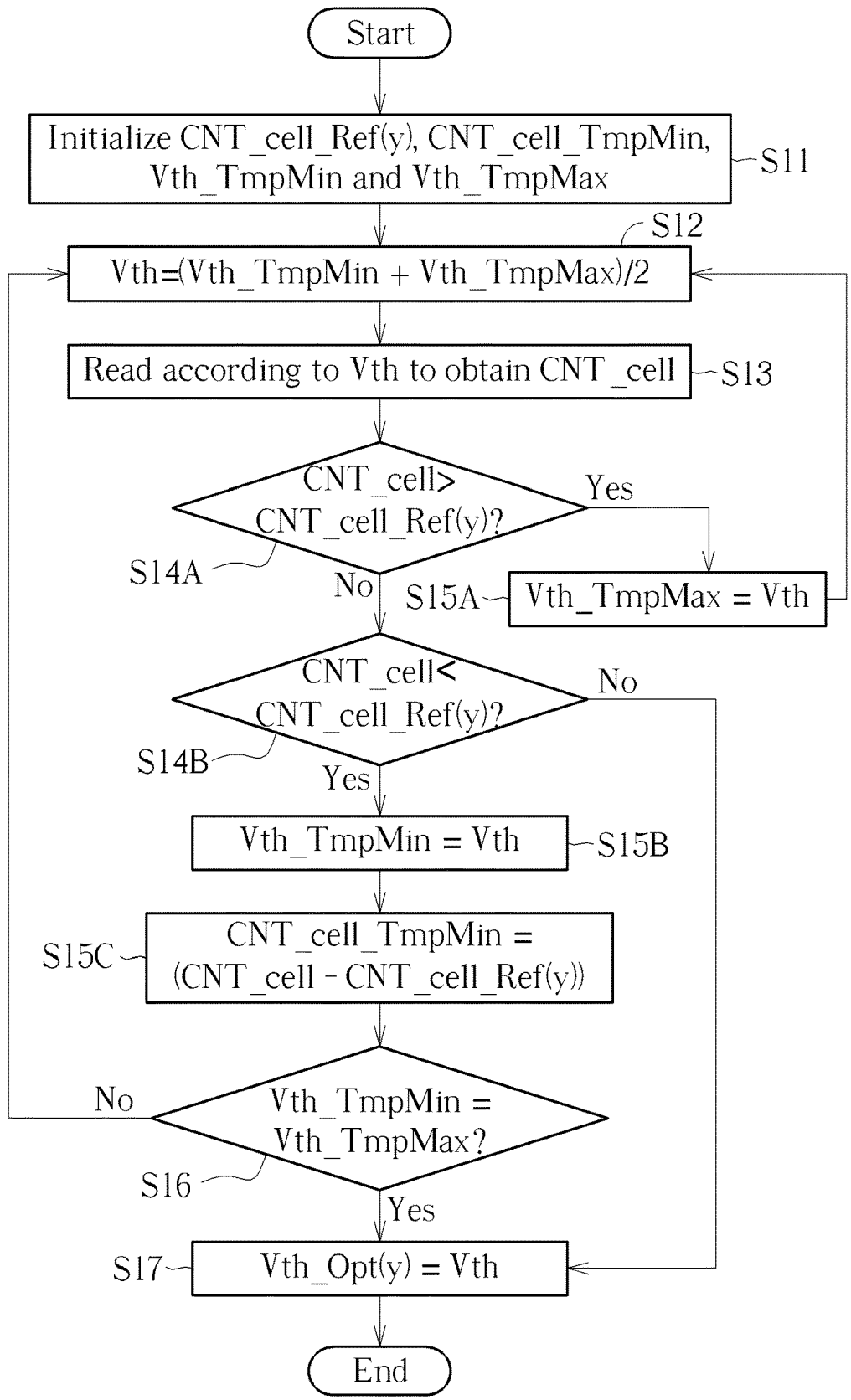
FIG. 7 is a diagram illustrating a reading parameter optimization procedure of the method according to an embodiment of the present invention.

FIG. 7 is a diagram illustrating a reading parameter optimization procedure of the method according to an embodiment of the present invention, where the reading parameter optimization procedure may comprise Steps S11-S13, S14A, S14B, S15A, S15B, S15C, S16 and S17 of the working flow shown in FIG. 7, but the present invention is not limited thereto. The memory controller 110 may perform the reading parameter optimization procedure to determine at least one optimized reading parameter corresponding to the reference memory cell count CNT_cell_Ref(y), such as the optimal reading voltage code Vth_Code_Opt(y) and/or the optimal reading voltage Vth_Opt(y), and more particularly, search for the optimal reading voltage Vth_Opt(y) in a binary search manner, in order to accurately determine the respective programming states {PS(y)} of the memory cells in the memory cell group, and therefore correctly determine the respective bit information of the memory cells in the memory cell group.

In Step S11, the memory controller 110 may initialize the reference memory cell count CNT_cell_Ref(y), a temporary minimum memory cell count CNT_cell_TmpMin, a temporary minimum reading voltage Vth_TmpMin and a temporary maximum reading voltage Vth_TmpMax, and more particularly, determine the reference memory cell count CNT_cell_Ref(y) according to the default setting, determine the temporary minimum memory cell count CNT_cell_TmpMin to be a default value such as a maximum available value with all bits thereof being equal to the logic value 1 (e.g., 0xFFFF, if the temporary minimum memory cell count CNT_cell_TmpMin has 16 bits), and set Vth_TmpMin=V_min and Vth_TmpMax=V_max, but the present invention is not limited thereto. According to some embodiments, the initial values of the temporary minimum reading voltage Vth_TmpMin and the temporary maximum reading voltage Vth_TmpMax may vary.

For example, the memory controller 110 may configure the memory cell group to be at least one page having CNT_cell_GRP memory cells, and the aforementioned at least one page may be arranged to store data of 18 kilobytes (KB) or 147456 bits. In a situation where there is no reading voltage distribution drift, after the randomized data is written or programmed into the aforementioned at least one page, an ideal value of the memory cell count CNT_cell regarding the aforementioned at least one optimized reading parameter (e.g., the optimal reading voltage Vth_Opt(y)) may be equal to ((y/Y)*CNT_cell_GRP)). Thus, the memory controller 110 may set the reference memory cell count CNT_cell_Ref(y) to be ((y/Y)*CNT_cell_GRP)). According to some embodiments, when CNT_cell_GRP=147456 and Y=2 and y=1, CNT_cell_Ref(y)=((y/Y)*CNT_cell_GRP))=73728, but the present invention is not limited thereto. For example, the group memory cell count CNT_cell_GRP, the programming state index y and/or the candidate programming state count Y may vary, and the reference memory cell count CNT_cell_Ref(y) may vary correspondingly.

In Step S12, the memory controller 110 may calculate the reading voltage Vth to be equal to the average of the temporary minimum reading voltage Vth_TmpMin and the temporary maximum reading voltage Vth_TmpMax, where Vth=(Vth_TmpMin+Vth_TmpMax)/2, but the present invention is not limited thereto. For example, the above equation for calculating the reading voltage Vth may vary.

In Step S13, the memory controller 110 may control the NV memory 120 to read according to the reading voltage Vth in order to obtain the memory cell count CNT_cell corresponding to the reading voltage Vth, and more particularly, set the reading voltage Vth to the NV memory 120 to read the memory cells of the memory cell group according to the reading voltage Vth in order to obtain the respective raw data (e.g., raw bits such as "1" or "0") of the memory cells, for determining the memory cell count CNT_cell. The memory cell count CNT_cell may represent the number of memory cells whose raw data such as raw bits are equal to a predetermined logic value such as "0" when the memory controller 110 is reading the memory cells of the memory cell group according to the reading voltage Vth. Among all raw data such as all raw bits read from the memory cells of the memory cell group, the memory controller 110 may count the number of raw bits that are equal to the logic value "0" to be the memory cell count CNT_cell.

In Step S14A, the memory controller 110 may determine whether the memory cell count CNT_cell is greater than the reference memory cell count CNT_cell_Ref(y). If Yes (e.g., CNT_cell>CNT_cell_Ref(y)), Step S15A is entered; if No (e.g., CNT_cell≤CNT_cell_Ref(y)), Step S14B is entered.

In Step S14B, the memory controller 110 may determine whether the memory cell count CNT_cell is less than the reference memory cell count CNT_cell_Ref(y). If Yes (e.g., CNT_cell<CNT_cell_Ref(y)), Step S15B is entered; if No (e.g., CNT_cell=CNT_cell_Ref(y)), Step S17 is entered.

In Step S15A, the memory controller 110 may update the temporary maximum reading voltage Vth_TmpMax to be equal to the reading voltage Vth of this moment (e.g., a time point when Step S15A is executed.

In Step S15B, the memory controller 110 may update the temporary minimum reading voltage Vth_TmpMin to be equal to the reading voltage Vth of this moment (e.g., a time point when Step S15B is executed).

In Step S15C, the memory controller 110 may update the temporary minimum memory cell count CNT_cell_TmpMin to be equal to a difference (CNT_cell-CNT_cell_Ref(y)) between the memory cell count CNT_cell and the reference memory cell count CNT_cell_Ref(y) of this moment (e.g., a time point when Step S15C is executed).

In Step S16, the memory controller 110 may determine whether the temporary minimum reading voltage Vth_TmpMin is equal to the temporary maximum reading voltage Vth_TmpMax. If Yes, Step S17 is entered; if No, Step S12 is entered.

In Step S17, the memory controller 110 may determine the optimal reading voltage Vth_Opt(y) to be equal to the reading voltage Vth of this moment (e.g., a time point when Step S17 is executed).

For better comprehension, the reading parameter optimization procedure may be illustrated with the working flow shown in FIG. 7, but the present invention is not limited thereto. According to some embodiments, one or more steps may be added, deleted, or changed in the working flow shown in FIG. 7. For example, the memory controller 110 may search for the optimal reading voltage code Vth_Code_Opt(y), and some parameters in the associated steps may change correspondingly.

Figure 8:
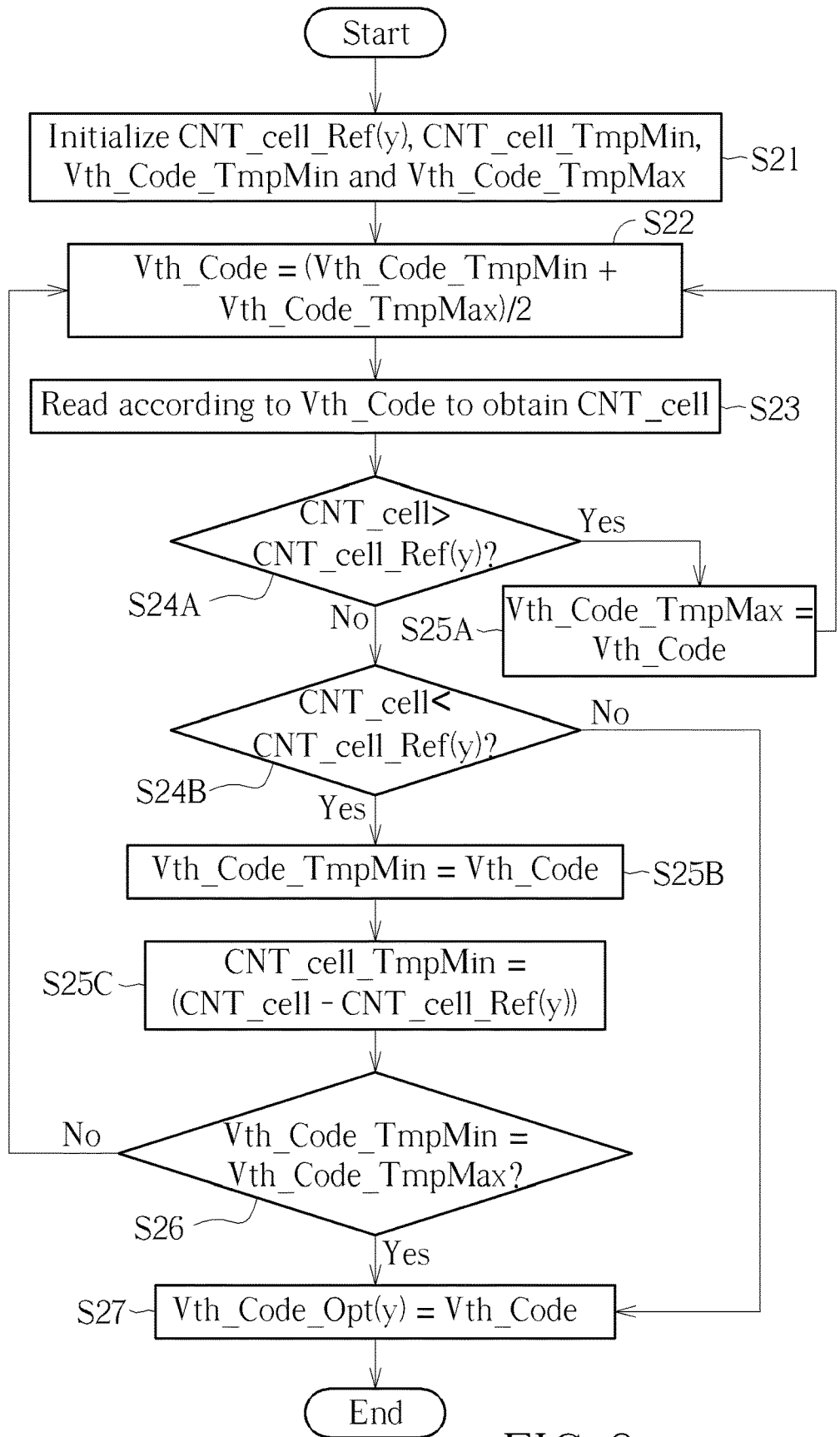
FIG. 8 is a diagram illustrating the reading parameter optimization procedure of the method according to another embodiment of the present invention.

FIG. 8 is a diagram illustrating the reading parameter optimization procedure of the method according to another embodiment of the present invention, where the reading parameter optimization procedure may comprise Steps S21-S23, S24A, S24B, S25A, S25B, S25C, S26 and S27 of the working flow shown in FIG. 8, but the present invention is not limited thereto. The memory controller 110 may perform the reading parameter optimization procedure to determine at least one optimized reading parameter corresponding to the reference memory cell count CNT_cell_Ref(y), such as the optimal reading voltage code Vth_Code_Opt(y) and/or the optimal reading voltage Vth_Opt(y), and more particularly, search for the optimal reading voltage code Vth_Code_Opt(y) in the binary search manner, in order to accurately determine the respective programming states {PS(y)} of the memory cells in the memory cell group, and therefore correctly determine the respective bit information of the memory cells in the memory cell group.

In Step S21, the memory controller 110 may initialize the reference memory cell count CNT_cell_Ref(y), a temporary minimum memory cell count CNT_cell_TmpMin, a temporary minimum reading voltage code Vth_Code_TmpMin and a temporary maximum reading voltage code Vth_Code_TmpMax, and more particularly, determine the reference memory cell count CNT_cell_Ref(y) according to the default setting, determine the temporary minimum memory cell count CNT_cell_TmpMin to be the default value such as the maximum available value (e.g., 0xFFFF), and set Vth_Code_TmpMin=V_min_Code and Vth_Code_TmpMax=V_max_Code, but the present invention is not limited thereto. According to some embodiments, the initial values of the temporary minimum reading voltage code Vth_Code_TmpMin and the temporary maximum reading voltage code Vth_Code_TmpMax may vary.

For example, the memory controller 110 may configure the memory cell group to be the aforementioned at least one page having CNT_cell_GRP memory cells. In a situation where there is no reading voltage distribution drift, after the randomized data is written or programmed into the aforementioned at least one page, an ideal value of the memory cell count CNT_cell regarding the aforementioned at least one optimized reading parameter (e.g., the optimal reading voltage code Vth_Code_Opt(y)) may be equal to ((y/Y)*CNT_cell_GRP)). Thus, the memory controller 110 may set the reference memory cell count CNT_cell_Ref(y) to be ((y/Y)*CNT_cell_GRP)). According to some embodiments, when CNT_cell_GRP=147456 and Y=2 and y=1, CNT_cell_Ref(y)=((y/Y)*CNT_cell_GRP))=73728, but the present invention is not limited thereto. For example, the group memory cell count CNT_cell_GRP, the programming state index y and/or the candidate programming state count Y may vary, and the reference memory cell count CNT_cell_Ref(y) may vary correspondingly. In addition, in a situation where V_min_Code=−128 and V_max_Code=+128, Vth_Code_TmpMin=V_min_Code=−128 and Vth_Code_TmpMax=V_max_Code=+128 at this moment (e.g., the time point when Step S21 is executed).

In Step S22, the memory controller 110 may calculate the reading voltage code Vth_Code to be equal to the average of the temporary minimum reading voltage code Vth_Code_TmpMin and the temporary maximum reading voltage code Vth_Code_TmpMax, where Vth_Code=(Vth_Code_TmpMin+Vth_Code_TmpMax)/2, but the present invention is not limited thereto. For example, the above equation for calculating the reading voltage code Vth_Code may vary.

In Step S23, the memory controller 110 may control the NV memory 120 to read according to the reading voltage code Vth_Code in order to obtain the memory cell count CNT_cell corresponding to the reading voltage code Vth_Code, and more particularly, set the reading voltage code Vth_Code to the NV memory 120 to read the memory cells of the memory cell group according to the reading voltage code Vth_Code in order to obtain the respective raw data (e.g., raw bits such as "1" or "0") of the memory cells, for determining the memory cell count CNT_cell. The memory cell count CNT_cell may represent the number of memory cells whose raw data such as raw bits are equal to the predetermined logic value such as "0" when the memory controller 110 is reading the memory cells of the memory cell group according to the reading voltage code Vth_Code. Among all raw data such as all raw bits read from the memory cells of the memory cell group, the memory controller 110 may count the number of raw bits that are equal to the logic value "0" to be the memory cell count CNT_cell.

In Step S24A, the memory controller 110 may determine whether the memory cell count CNT_cell is greater than the reference memory cell count CNT_cell_Ref(y). If Yes (e.g., CNT_cell>CNT_cell_Ref(y)), Step S25A is entered; if No (e.g., CNT_cell≤CNT_cell_Ref(y)), Step S24B is entered.

In Step S24B, the memory controller 110 may determine whether the memory cell count CNT_cell is less than the reference memory cell count CNT_cell_Ref(y). If Yes (e.g., CNT_cell<CNT_cell_Ref(y)), Step S25B is entered; if No (e.g., CNT_cell=CNT_cell_Ref(y)), Step S27 is entered.

In Step S25A, the memory controller 110 may update the temporary maximum reading voltage code Vth_Code_TmpMax to be equal to the reading voltage code Vth_Code of this moment (e.g., a time point when Step S25A is executed).

In Step S25B, the memory controller 110 may update the temporary minimum reading voltage code Vth_Code_TmpMin to be equal to the reading voltage code Vth_Code of this moment (e.g., a time point when Step S25B is executed).

In Step S25C, the memory controller 110 may update the temporary minimum memory cell count CNT_cell_TmpMin to be equal to a difference (CNT_cell-CNT_cell_Ref(y)) between the memory cell count CNT_cell and the reference memory cell count CNT_cell_Ref(y) of this moment (e.g., a time point when Step S25C is executed).

In Step S26, the memory controller 110 may determine whether the temporary minimum reading voltage code Vth_Code_TmpMin is equal to the temporary maximum reading voltage code Vth_Code_TmpMax. If Yes, Step S27 is entered; if No, Step S22 is entered.

In Step S27, the memory controller 110 may determine the optimal reading voltage code Vth_Code_Opt(y) to be equal to the reading voltage code Vth_Code of this moment (e.g., a time point when Step S27 is executed).

For better comprehension, the reading parameter optimization procedure may be illustrated with the working flow shown in FIG. 8, but the present invention is not limited thereto. According to some embodiments, one or more steps may be added, deleted, or changed in the working flow shown in FIG. 8.

According to some embodiments, the memory controller 110 may adjust the reading voltage Vth of Step S12 and/or the reading voltage code Vth_Code of Step S22 according to the latest value of the temporary minimum memory cell count CNT_cell_TmpMin, in order to enhance the overall performance. For example, the memory cell count CNT_cell may be positively correlated with the reading voltage Vth, and the temporary minimum memory cell count CNT_cell_TmpMin may indicate the projection of the distance between a current point (Vth, CNT_cell) and a target point (Vth_Opt(y), CNT_cell_Ref(y)) on the CNT_cell axis. When the temporary minimum memory cell count CNT_cell_TmpMin has been updated in Step S15C in the working flow shown in FIG. 7, the memory controller 110 may adjust the weightings of the temporary minimum reading voltage Vth_TmpMin and the temporary maximum reading voltage Vth_TmpMax in Step S12 as follows:

$$Vth = (f11 * Vth\_TmpMin) + (f12 * Vth\_TmpMax);$$

where 0≤f11≤1, 0≤f12≤1, and f11+f12=1. More particularly, the weightings f11 and f12 may represent weighting functions f11(CNT_cell_TmpMin) and f12(CNT_cell_TmpMin), respectively, and the above equation may be written as follows:

$$Vth = (f11\,(CNT\_cell\_TmpMin) * Vth\_TmpMin) +$$
$$(f12\,(CNT\_cell\_TmpMin) * Vth\_TmpMax);$$

where the memory controller 110 may use the weighting functions f11(CNT_cell_TmpMin) and f12(CNT_cell_TmpMin) to make the temporary minimum memory cell count CNT_cell_TmpMin converge or approach zero rapidly. For another example, the memory cell count CNT_cell may be positively correlated with the reading voltage code Vth_Code, and the temporary minimum memory cell count CNT_cell_TmpMin may indicate the projection of the distance between a current point (Vth_Code, CNT_cell) and a target point (Vth_Code_Opt(y), CNT_cell_Ref(y)) on the CNT_cell axis. When the temporary minimum memory cell count CNT_cell_TmpMin has been updated in Step S25C in the working flow shown in FIG. 8, the memory controller 110 may adjust the weightings of the temporary minimum reading voltage code Vth_Code_TmpMin and the temporary maximum reading voltage code Vth_Code_TmpMax in Step S22 as follows:

$$Vth\_Code = (f21 * Vth\_Code\_TmpMin) + (f22 * Vth\_Code\_TmpMax);$$

where 0≤f21≤1, 0≤f22≤1, and f21+f22=1. More particularly, the weightings f21 and f22 may represent weighting functions f21(CNT_cell_TmpMin) and f22 (CNT_cell_TmpMin), respectively, and the above equation may be written as follows:

$$Vth\_Code = (f21\,(CNT\_cell\_TmpMin) * Vth\_Code\_TmpMin) +$$
$$(f22\,(CNT\_cell\_TmpMin) * Vth\_Code\_TmpMax);$$

where the memory controller 110 may use the weighting functions f21(CNT_cell_TmpMin) and f22 (CNT_cell_TmpMin) to make the temporary minimum memory cell count CNT_cell_TmpMin converge or approach zero rapidly. For brevity, similar descriptions for these embodiments are not repeated in detail here.

TABLE 1

| Vth_Code_TmpMin | Vth_Code_TmpMax | Vth_Code | CNT_cell | CNT_S |
|---|---|---|---|---|
| −128 | +128 | (−128 + 128)/2 = 0 | 72000 | 1 |

Table 1 illustrates an example of some parameters in the one or more searching operations mentioned above, where the symbol "CNT_s" may represent an accumulated number of searching operations, but the present invention is not limited thereto. The reference memory cell count CNT_cell_Ref(y) may be equal to 72000, and the initial values of the temporary minimum reading voltage code Vth_Code_TmpMin and the temporary maximum reading voltage code Vth_Code_TmpMax may be equal to −128 and +128, respectively. When Vth_Code_TmpMin=−128 and Vth_Code_TmpMax=+128, the memory controller 110 may calculate the reading voltage code Vth_Code to be equal to 0 in Step S22, and determine that CNT_cell=72000 in Step S23, where CNT_s=1. As the memory cell count CNT_cell has reached the reference memory cell count CNT_cell_Ref (y), the memory controller 110 may determine that Vth_Code_Opt(y)=Vth_Code=0 in Step S27, and the operation of searching for the optimal reading voltage code Vth_Code_Opt(y) is completed.

TABLE 2

| Vth_Code_TmpMin | Vth_Code_TmpMax | Vth_Code | CNT_cell | CNT_s |
|---|---|---|---|---|
| −50 | +100 | (−50 + 100)/2 = +25 | 82000 | 1 |
| −50 | +25 | (−50 + 25)/2 ~= −12 | 71000 | 2 |
| −12 | +25 | (−12 + 25)/2 ~= +6 | 72000 | 3 |

Table 2 illustrates another example of some parameters in the one or more searching operations mentioned above, but the present invention is not limited thereto. The reference memory cell count CNT_cell_Ref(y) may be equal to 72000, and the initial values of the temporary minimum reading voltage code Vth_Code_TmpMin and the temporary maximum reading voltage code Vth_Code_TmpMax may be equal to −50 and +100, respectively. When Vth_Code_TmpMin=−50 and Vth_Code_TmpMax=+100, the memory controller 110 may calculate the reading voltage code Vth_Code to be equal to +25 in Step S22, and determine that CNT_cell=82000 in Step S23, where CNT_s=1; when Vth_Code_TmpMin=−50 and Vth_Code_TmpMax=+25, the memory controller 110 may calculate the reading voltage code Vth_Code to be equal to −12 in Step S22, and determine that CNT_cell=71000 in Step S23, where CNT_s=2; and when Vth_Code_TmpMin=−12 and Vth_Code_TmpMax=+25, the memory controller 110 may calculate the reading voltage code Vth_Code to be equal to +6 in Step S22, and determine that CNT_cell=72000 in Step S23, where CNT_s=3. As the memory cell count CNT_cell has reached the reference memory cell count CNT_cell_Ref (y), the memory controller 110 may determine that Vth_Code_Opt(y)=Vth_Code=+6 in Step S27, and the operation of searching for the optimal reading voltage code Vth_Code_Opt(y) is completed.

According to some embodiments, the memory controller 110 may adjust the fixed step size Vstep_Code for performing the associated operations (e.g., scanning and/or searching operations) in the predetermined reading voltage code range [V_a_Code, V_b_Code], and more particularly, set the fixed step size Vstep_Code to be any of other values greater than one. For brevity, similar descriptions for these embodiments are not repeated in detail here.

TABLE 3

| Vth_Code_TmpMin | Vth_Code_TmpMax | Vth_Code | CNT_cell | CNT_s |
|---|---|---|---|---|
| −128 | +128 | (−128 + 128)/2 = 0 | . . . | 1 |
| 0 | +128 | (0 + 128)/2 ~= +64 | . . . | 2 |
| 0 | +64 | (0 + 64)/2 ~= +32 | . . . | 3 |
| 0 | +32 | (0 + 32)/2 ~= +16 | . . . | 4 |
| 0 | +16 | (0 + 16)/2 ~= +8 | . . . | 5 |
| 0 | +8 | (0 + 8)/2 ~= +4 | . . . | 6 |
| 0 | +4 | (0 + 4)/2 ~= +2 | . . . | 7 |
| 0 | +2 | (0 + 2)/2 ~= +1 | 72000 | 8 |

Table 3 illustrates yet another example of some parameters in the one or more searching operations mentioned above, where the symbol " . . . " may indicate that some table contents may be omitted, but the present invention is not limited thereto. The reference memory cell count CNT_cell_Ref(y) may be equal to 72000, and the initial values of the temporary minimum reading voltage code Vth_Code_TmpMin and the temporary maximum reading voltage code Vth_Code_TmpMax may be equal to −128 and +128, respectively. When Vth_Code_TmpMin=−128 and Vth_Code_TmpMax=+128, the memory controller 110 may calculate the reading voltage code Vth_Code to be equal to 0 in Step S22, and determine the memory cell count CNT_cell to be a first value in Step S23, where CNT_s=1; when Vth_Code_TmpMin=0 and Vth_Code_TmpMax=+128, the memory controller 110 may calculate the reading voltage code Vth_Code to be equal to +64 in Step S22, and determine the memory cell count CNT_cell to be a second value in Step S23, where CNT_s=2; when Vth_Code_TmpMin=0 and Vth_Code_TmpMax=+64, the memory controller 110 may calculate the reading voltage code Vth_Code to be equal to +32 in Step S22, and determine the memory cell count CNT_cell to be a third value in Step S23, where CNT_s=3; and the rest may be deduced by analogy, for example, when Vth_Code_TmpMin=0 and Vth_Code_TmpMax=+2, the memory controller 110 may calculate the reading voltage code Vth_Code to be equal to +1 in Step S22, and determine that CNT_cell=72000 in Step S23, where CNT_s=8. As the memory cell count CNT_cell has reached the reference memory cell count CNT_cell_Ref(y), the memory controller 110 may determine that Vth_Code_Opt(y)=Vth_Code=+1 in Step S27, and the operation of searching for the optimal reading voltage code Vth_Code_Opt(y) is completed.

As illustrated with the example shown in Table 3, the memory controller 110 can rapidly complete the operation of searching for the optimal reading voltage code Vth_Code_Opt(y), even in a worst case (e.g., the case where CNT_s=8, if the full range of the reading voltage code Vth_Code is equal to the interval [−128, +128]). In addition, the memory controller 110 can use the full range of the reading voltage code Vth_Code to cover any possible reading voltage drift phenomenon, and set the fixed step size Vstep_Code to be a minimum available value such as one to increase the searching accuracy. Therefore, the present invention method and the associated apparatus can enhance the overall performance.

Figure 9:
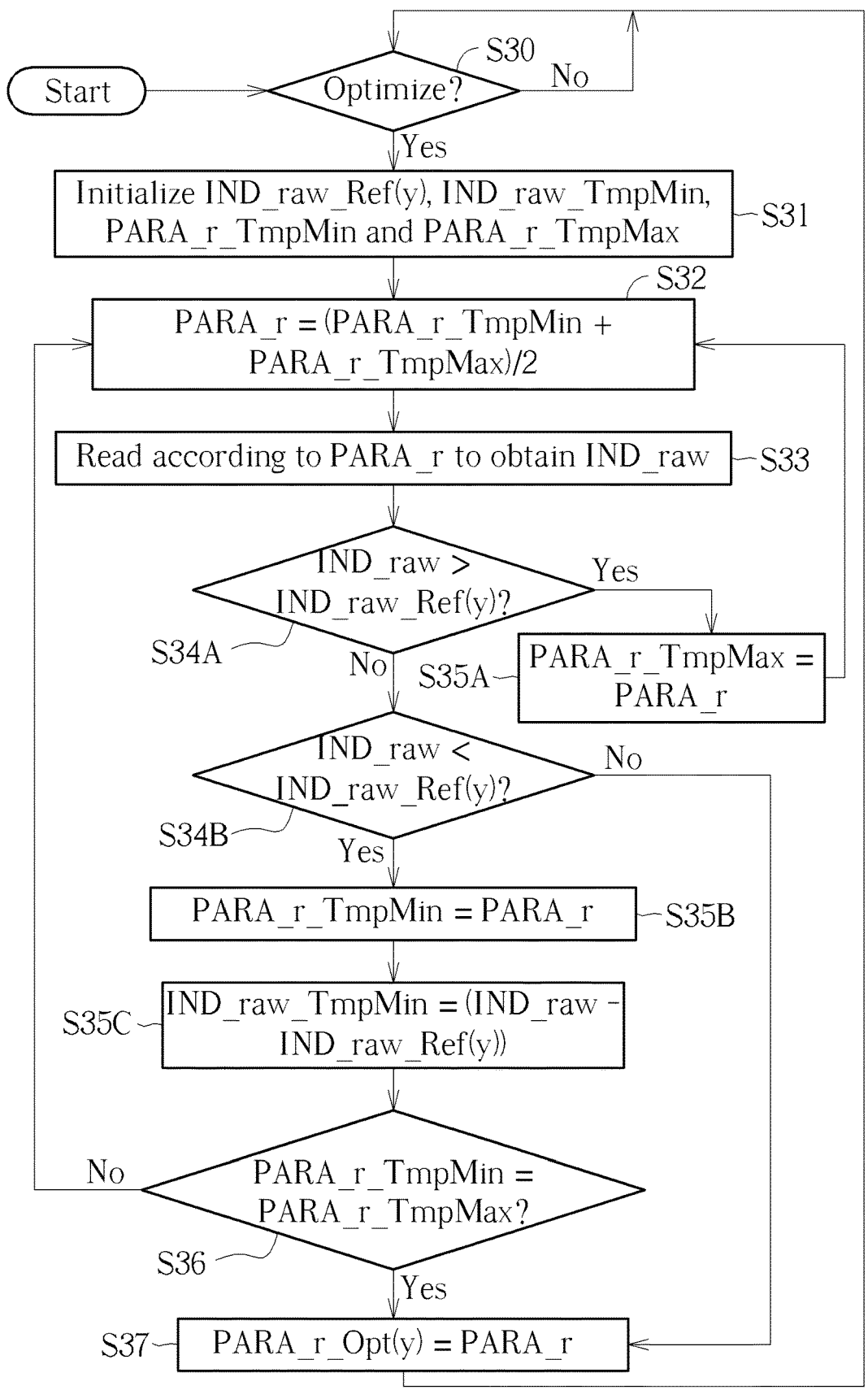
FIG. 9 is a diagram illustrating a working flow of the method according to an embodiment of the present invention.

FIG. 9 is a diagram illustrating a working flow of the method according to an embodiment of the present invention. The memory controller 110 may receive the plurality of host commands from the host device 50 through the transmission interface circuit 118, for performing data access (e.g., data reading and data writing/programming) on the NV memory 120 according to the plurality of host commands, and perform the reading parameter optimization procedure to determine at least one optimized reading parameter PARA_r(y) corresponding to at least one raw data indication reference IND_raw_Ref(y), such as the optimized reading parameters {PARA_r(1), . . . , PARA_r(Y−1)} corresponding to the raw data indication references {IND_raw_Ref(1), . . . , IND_raw_Ref(Y−1)}, for maintaining correctness of the data reading, where the aforementioned at least one optimized reading parameter PARA_r(y) may comprise one or a combination of the optimal reading voltage Vth_Opt(y) and the optimal reading voltage code Vth_Code_Opt(y). For example, the reading parameter optimization procedure may comprise Steps S31-S33, S34A, S34B, S35A, S35B, S35C, S36 and S37 of the working flow shown in FIG. 9, but the present invention is not limited thereto. The memory controller 110 may perform the reading parameter optimization procedure to determine the aforementioned at least one optimized reading parameter PARA_r(y), such as the optimal reading voltage code Vth_Code_Opt(y) and/or the optimal reading voltage Vth_Opt(y), and more particularly, search for the optimized reading parameter PARA_r(y) in the binary search manner, in order to accurately determine the respective programming states {PS(y)} of the memory cells in the memory cell group, and therefore correctly determine the respective bit information of the memory cells in the memory cell group.

In Step S30, the memory controller 110 may determine whether to optimize a reading parameter PARA_r (e.g., the reading voltage Vth or the reading voltage code Vth_Code). If Yes, Step S31 is entered; if No, Step S30 is re-entered.

In Step S31, the memory controller 110 may initialize the raw data indication reference IND_raw_Ref(y) (e.g., the reference memory cell count CNT_cell_Ref(y) of Steps S11 and S21), a temporary minimum raw data indication IND_raw_TmpMin (e.g., the temporary minimum memory cell count CNT_cell_TmpMin of Steps S11 and S21), a temporary minimum reading parameter PARA_r_TmpMin (e.g., the temporary minimum reading voltage Vth_TmpMin of Step S11 or the temporary minimum reading voltage code Vth_Code_TmpMin of Step S21) and a temporary maximum reading parameter PARA_r_TmpMax (e.g., the temporary maximum reading voltage Vth_TmpMax of Step S11 or the temporary maximum reading voltage code Vth_Code_TmpMax of Step S21), and more particularly, determine the raw data indication reference IND_raw_Ref(y) according to the default setting, determine the temporary minimum raw data indication IND_raw_TmpMin to be the default value such as the maximum available value (e.g., 0xFFFF), and set PARA_r_TmpMin=PARA_r_min (e.g., V_min or V_min_Code) and PARA_r_TmpMax=PARA_r_max (e.g., V_max or V_max_Code), but the present invention is not limited thereto. According to some embodiments, the initial values of the temporary minimum reading parameter PARA_r_TmpMin and the temporary maximum reading parameter PARA_r_TmpMax may vary.

In Step S32, the memory controller 110 may calculate the reading parameter PARA_r (e.g., the reading voltage Vth of Step S12 or the reading voltage code Vth_Code of Step S22) to be equal to the average of the temporary minimum reading parameter PARA_r_TmpMin and the temporary maximum reading parameter PARA_r_TmpMax, where PARA_r=(PARA_r_TmpMin+PARA_r_TmpMax)/2, but the present invention is not limited thereto. For example, the above equation for calculating the reading parameter PARA_r may vary.

In Step S33, the memory controller 110 may control the NV memory 120 to read according to the reading parameter PARA_r in order to obtain a raw data indication IND_raw (e.g., the memory cell count CNT_cell) corresponding to the reading parameter PARA_r, and more particularly, set the reading parameter PARA_r to the NV memory 120 to read the memory cells of the memory cell group according to the reading parameter PARA_r in order to obtain the respective raw data of the memory cells, for determining the raw data indication IND_raw. The respective raw data of the memory cells in the memory cell group may represent a plurality of raw bits (e.g., the raw bits such as "1" and "0"), where a raw bit of any memory cells among these memory cells is equal to either the predetermined logic value (e.g., "0") or another predetermined logic value (e.g., "1").

For example, the raw data indication IND_raw may be equal to the memory cell count CNT_cell and therefore the raw data indication reference IND_raw_Ref(y) may be rewritten as the reference memory cell count CNT_cell_Ref (y), and the memory cell count CNT_cell may represent the number of memory cells whose raw bits are equal to the predetermined logic value such as "0" in the situation where the memory controller 110 is reading the memory cells of the memory cell group according to the reading parameter PARA_r, but the present invention is not limited thereto. For another example, the raw data indication IND_raw may be equal to a bit count CNT_Bit0 of the raw bits that are equal to the predetermined logic value such as "0" in the situation where the memory controller 110 is reading the memory cells of the memory cell group according to the reading parameter PARA_r, and therefore the raw data indication reference IND_raw_Ref(y) may be rewritten as the reference bit count CNT_Bit0_Ref(y) (e.g., CNT_Bit0_Ref(y)=CNT_cell_Ref(y)), and the temporary minimum raw data indication IND_raw_TmpMin may be rewritten as the temporary minimum bit count CNT_Bit0_TmpMin (e.g., CNT_Bit0_TmpMin=CNT_cell_TmpMin).

In Step S34A, the memory controller 110 may determine whether the raw data indication IND_raw is greater than the raw data indication reference IND_raw_Ref(y). If Yes (e.g., IND_raw>IND_raw_Ref(y)), Step S35A is entered; if No (e.g., IND_raw≤IND_raw_Ref(y)), Step S34B is entered.

In Step S34B, the memory controller 110 may determine whether the raw data indication IND_raw is less than the raw data indication reference IND_raw_Ref(y). If Yes (e.g., IND_raw<IND_raw_Ref(y)), Step S35B is entered; if No (e.g., IND_raw=IND_raw_Ref(y)), Step S37 is entered.

In Step S35A, the memory controller 110 may update the temporary maximum reading parameter PARA_r_TmpMax to be equal to the reading parameter PARA_r of this moment (e.g., a time point when Step S35A is executed).

In Step S35B, the memory controller 110 may update the temporary minimum reading parameter PARA_r_TmpMin to be equal to the reading parameter PARA_r of this moment (e.g., a time point when Step S35B is executed).

In Step S35C, the memory controller 110 may update the temporary minimum raw data indication IND_raw_TmpMin to be equal to a difference (IND_raw-IND_raw_Ref(y)) between the raw data indication IND_raw and the raw data indication reference IND_raw_Ref(y) of this moment (e.g., a time point when Step S35C is executed).

In Step S36, the memory controller 110 may determine whether the temporary minimum reading parameter PARA_r_TmpMin is equal to the temporary maximum reading parameter PARA_r_TmpMax. If Yes, Step S37 is entered; if No, Step S32 is entered.

In Step S37, the memory controller 110 may determine the optimized reading parameter PARA_r(y) (e.g., the optimal reading voltage Vth_Opt(y) of Step S17 or the optimal reading voltage code Vth_Code_Opt(y) of Step S27) to be equal to the reading parameter PARA_r (e.g., the reading voltage Vth or the reading voltage code Vth_Code) of this moment (e.g., a time point when Step S37 is executed).

In any iteration among at least one iteration of the reading parameter optimization procedure, the memory controller 110 may calculate the reading parameter PARA_r in Step S32, control the NV memory 120 to read according to the reading parameter PARA_r to obtain the raw data indication IND_raw in Step S33, and compare the raw data indication IND_raw with the raw data indication reference IND_raw_Ref(y) to determine whether the raw data indication IND_raw is greater than or less than the raw data indication reference IND_raw_Ref(y) in one or more steps among Steps S34A and S34B, for selectively adjusting the temporary maximum reading parameter in Step S35A or adjusting the temporary minimum reading parameter to be equal to the reading parameter in Step S35B. In the last iteration among the aforementioned at least one iteration, in response to the raw data indication IND_raw being equal to the raw data indication reference IND_raw_Ref(y), the memory controller 110 may determine the optimized reading parameter PARA_r(y) to be equal to the reading parameter PARA_r in Step S37. For example, the memory controller 110 may determine the average of the temporary minimum reading parameter PARA_r_TmpMin and the temporary maximum reading parameter PARA_r_TmpMax in the binary search manner at least one time, to rapidly complete the operation of searching for the optimized reading parameter PARA_r(y).

For better comprehension, the method may be illustrated with the working flow shown in FIG. 9, but the present invention is not limited thereto. According to some embodiments, one or more steps may be added, deleted, or changed in the working flow shown in FIG. 9. For example, the plurality of host commands may comprise a read command such as that mentioned above, and an uncorrectable error correction code (UECC) error occurs during reading the NV memory 120 according to the read command. The memory controller 110 may have used the ECC circuit 1152 to perform ECC decoding on the read out version of the encoded data, but fail to recover the encoded data. In response to the occurrence of the UECC error, the memory controller 110 may perform the read retry procedure to try reading the NV memory 120 with at least one adjusted reading voltage Vth, where the at least one optimized reading parameter PARA_r(y) may comprises the aforementioned at least one adjusted reading voltage Vth such as the optimal reading voltage Vth_Opt(y). For another example, the memory controller 110 may perform the reading parameter optimization procedure multiple times during a lifetime of the memory device 100, and more particularly, perform the reading parameter optimization procedure periodically or intermittently, for maintaining the correctness of the data reading. For brevity, similar descriptions for these embodiments are not repeated in detail here.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for performing data access control of a memory device, the method being applied to a memory controller of the memory device, the memory device comprising the memory controller and a non-volatile (NV) memory, the NV memory comprising at least one NV memory element, the method comprising:
   receiving a plurality of host commands from a host device, for performing data access on the NV memory according to the plurality of host commands, wherein the data access comprises data reading; and
   performing a reading parameter optimization procedure to determine at least one optimized reading parameter, for maintaining correctness of the data reading, wherein the reading parameter optimization procedure comprises:
      initializing a raw data indication reference, a temporary minimum reading parameter and a temporary maximum reading parameter, wherein the raw data indication reference is determined according to a default setting, and the temporary minimum reading parameter and the temporary maximum reading parameter are determined to be a maximum and a minimum of an adjustable reading parameter range of a reading parameter, respectively;
      in any iteration among at least one iteration of the reading parameter optimization procedure, calculating the reading parameter to be equal to an average of the temporary minimum reading parameter and the temporary maximum reading parameter;
      in said any iteration, controlling the NV memory to read according to the reading parameter, in order to obtain respective raw data of multiple memory cells in a memory cell group, for determining a raw data indication, wherein the raw data indication represents a number of memory cells whose raw data are equal to a predetermined logic value in a situation where the memory controller is reading the multiple memory cells of the memory cell group according to the reading parameter; and
      in said any iteration, comparing the raw data indication with the raw data indication reference to determine whether the raw data indication is greater than or less than the raw data indication reference, for selectively adjusting the temporary maximum reading parameter or the temporary minimum reading parameter to be equal to the reading parameter;
      wherein in a last iteration among at least one iteration, in response to the raw data indication being equal to the raw data indication reference, the memory controller is arranged to determine a first optimized reading parameter among the at least one optimized reading parameter to be equal to the reading parameter.

2. The method of claim 1, wherein the at least one optimized reading parameter comprises one or a combination of an optimal reading voltage and an optimal reading voltage code.

3. The method of claim 1, wherein the respective raw data of the multiple memory cells in the memory cell group represent a plurality of raw bits, wherein a raw bit of any memory cells among the multiple memory cells is equal to either the predetermined logic value or another predetermined logic value.

4. The method of claim 3, wherein the raw data indication is equal to a memory cell count, and the memory cell count represents the number of memory cells whose raw bits are equal to the predetermined logic value in the situation where the memory controller is reading the multiple memory cells of the memory cell group according to the reading parameter.

5. The method of claim 3, wherein the raw data indication is equal to a bit count of the raw bits that are equal to the predetermined logic value in the situation where the memory controller is reading the multiple memory cells of the memory cell group according to the reading parameter.

6. The method of claim 1, wherein the plurality of host commands comprise a read command, and an uncorrectable error correction code (UECC) error occurs during reading the NV memory according to the read command; and the method further comprises:
   in response to occurrence of the UECC error, performing a read retry procedure to try reading the NV memory with at least one adjusted reading voltage, wherein the at least one optimized reading parameter comprises the at least one adjusted reading voltage.

7. The method of claim 1, wherein the memory controller is arranged to perform the reading parameter optimization procedure multiple times during a lifetime of the memory device, for maintaining the correctness of the data reading.

8. The method of claim 1, wherein in the at least one iteration, the memory controller is arranged to determine the average of the temporary minimum reading parameter and the temporary maximum reading parameter in a binary search manner at least one time.

9. A memory controller of a memory device, the memory device comprising the memory controller and a non-volatile (NV) memory, the NV memory comprising at least one NV memory element, the memory controller comprising:
   a processing circuit, arranged to control the memory controller according to a plurality of host commands from a host device, to allow the host device to access the NV memory through the memory controller; and
   a transmission interface circuit, arranged to perform communications with the host device;
   wherein:
      the memory controller receives the plurality of host commands from the host device through the transmission interface circuit of the memory controller, for performing data access on the NV memory according to the plurality of host commands, wherein the data access comprises data reading; and
      the memory controller performs a reading parameter optimization procedure to determine at least one optimized reading parameter, for maintaining correctness of the data reading, wherein the reading parameter optimization procedure comprises:
         initializing a raw data indication reference, a temporary minimum reading parameter and a temporary maximum reading parameter, wherein the raw data indication reference is determined according to a default setting, and the temporary minimum reading parameter and the temporary maximum reading parameter are determined to be a maximum and a minimum of an adjustable reading parameter range of a reading parameter, respectively;
         in any iteration among at least one iteration of the reading parameter optimization procedure, calculating the reading parameter to be equal to an average of the temporary minimum reading parameter and the temporary maximum reading parameter;

in said any iteration, controlling the NV memory to read according to the reading parameter, in order to obtain respective raw data of multiple memory cells in a memory cell group, for determining a raw data indication, wherein the raw data indication represents a number of memory cells whose raw data are equal to a predetermined logic value in a situation where the memory controller is reading the multiple memory cells of the memory cell group according to the reading parameter; and in said any iteration, comparing the raw data indication with the raw data indication reference to determine whether the raw data indication is greater than or less than the raw data indication reference, for selectively adjusting the temporary maximum reading parameter or the temporary minimum reading parameter to be equal to the reading parameter;

wherein in a last iteration among at least one iteration, in response to the raw data indication being equal to the raw data indication reference, the memory controller is arranged to determine a first optimized reading parameter among the at least one optimized reading parameter to be equal to the reading parameter.

10. The memory device comprising the memory controller of claim 9, wherein the memory device comprises:

the NV memory, configured to store information; and the memory controller, coupled to the NV memory, configured to control operations of the memory device.

11. An electronic device comprising the memory device of claim 10, and further comprising:

the host device, coupled to the memory device, wherein the host device comprises:

at least one processor, arranged for controlling operations of the host device; and a power supply circuit, coupled to the at least one processor, arranged for providing power to the at least one processor and the memory device;

wherein the memory device provides the host device with storage space.

* * * * *